United States Patent
Tsubaki et al.

(10) Patent No.: US 8,836,769 B2
(45) Date of Patent: Sep. 16, 2014

(54) 3D MODEL DISPLAY APPARATUS WITH ARRAY MODULATOR

(75) Inventors: Hidetoshi Tsubaki, Utsunomiya (JP); Toshiyuki Sudo, Utsunomiya (JP); Tsutomu Osaka, Yokohama (JP); Hiroshi Nishihara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2305 days.

(21) Appl. No.: 11/490,134

(22) Filed: Jul. 21, 2006

(65) Prior Publication Data

US 2007/0019067 A1    Jan. 25, 2007

(30) Foreign Application Priority Data

Jul. 25, 2005 (JP) ................. 2005-214515

(51) Int. Cl.
H04N 13/04 (2006.01)
(52) U.S. Cl.
CPC ....... *H04N 13/0447* (2013.01); *H04N 13/0409* (2013.01); *H04N 13/0404* (2013.01); *H04N 13/0418* (2013.01)
USPC .................. 348/51; 348/42; 348/46
(58) Field of Classification Search
CPC ...................................................... H04N 13/00
USPC ............................ 348/51–55; 345/7; 359/462
See application file for complete search history.

(56) References Cited

U.S. PATENT DOCUMENTS

| | | | |
|---|---|---|---|
| 6,201,565 B1 | 3/2001 | Balogh | |
| 6,798,390 B1 | 9/2004 | Sudo et al. | 345/7 |
| 7,190,518 B1 * | 3/2007 | Kleinberger et al. | 359/465 |
| 2001/0013971 A1 * | 8/2001 | Kleinberger et al. | 359/465 |
| 2002/0154215 A1 * | 10/2002 | Schechterman et al. | 348/51 |
| 2003/0086167 A1 * | 5/2003 | Sonehara | 359/471 |
| 2004/0056824 A1 * | 3/2004 | Sudo et al. | 345/7 |
| 2004/0057111 A1 * | 3/2004 | Dominguez Motntes | 359/462 |
| 2005/0191016 A1 * | 9/2005 | Ishikawa et al. | 385/115 |

FOREIGN PATENT DOCUMENTS

| | | |
|---|---|---|
| JP | 11-103474 | 4/1999 |
| JP | 2000-509591 T | 7/2000 |
| JP | 2002-287086 | 10/2002 |
| JP | 2003-307709 | 10/2003 |
| JP | 2004-184938 A | 7/2004 |

OTHER PUBLICATIONS

Y. Kajiki, "Hologram-Like Video Images by 45-View Stereoscopic Display", Proceedings of SPIE, vol. 3012, pp. 154-166, Stereoscopic Displays and Virtual Reality Systems IV (1997).

(Continued)

*Primary Examiner* — Jessica M Prince
(74) *Attorney, Agent, or Firm* — Fitzpatrick, Cella, Harper & Scinto

(57) ABSTRACT

A 3D image display apparatus is disclosed which includes a ray modulator which emits a directive ray in a time series manner based on parallax image information, a scanner which deflects the ray from the ray modulator and scans a predetermined plane two-dimensionally with the deflected ray, a light emitting point distributor which is arranged on a light emission side of the scanner to form a plurality of light emitting points, and a light emitting point multiplexer which is arranged on the light emission side of the light emitting point distributor to form a plurality of secondary light emitting points with rays from individual ones of the light emitting points, to enable stereopsis with a super multi-view region at a high resolution.

20 Claims, 20 Drawing Sheets

(56) References Cited

OTHER PUBLICATIONS

T. Sudo, et al., "3D Display Using Intersection of Light Beams", Proceedings of SPIE, vol. 3957, pp. 215-224, Stereoscopic Displays and Virtual Reality Systems VII (2000).

C. Masuda, "3D Display", Sangyou Tosho K. K., pp. 7-11(with partial English translation).

Japanese Office Action dated Mar. 1, 2011, in related corresponding Japanese Patent Appln. No. 2005-214515.

* cited by examiner

F I G. 16A
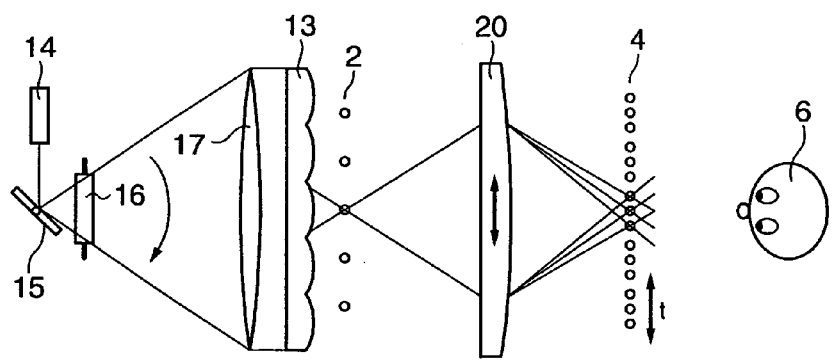
F I G. 16B
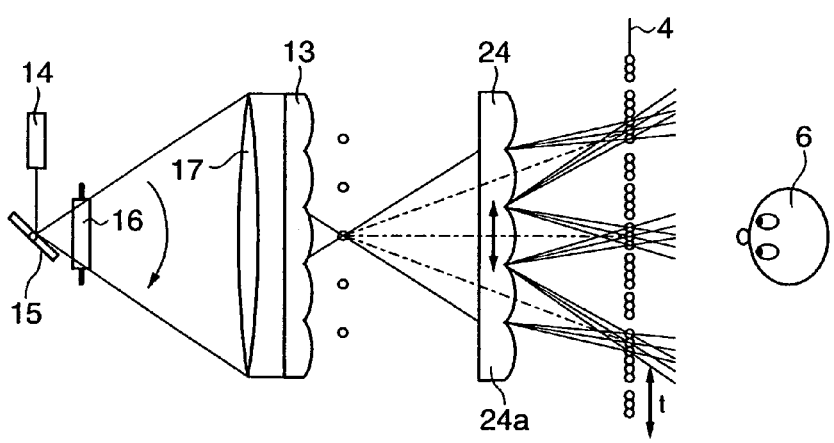

3D MODEL DISPLAY APPARATUS WITH ARRAY MODULATOR

BACKGROUND OF THE INVENTION

1. Field of the Invention

The present invention relates to a 3D (three dimensional) image display apparatus which is suitable to display a 3D image in a television, video display, computer monitor, or game machine.

2. Description of the Related Art

Conventionally, various methods have been attempted as a 3D image reproducing method of reproducing a 3D image. Particularly, a naked-eye stereopsis method with which the observer need not wear special eyeglasses or the like is considered promising as the next-generation image information presentation device because it can attain a 3D sense with a live feeling.

According to a general naked-eye stereopsis method, the observer recognizes a 3D image with a two-eye parallax method which presents a right-eye parallax image and left-eye parallax image independently to the corresponding eyes of the observer. To present parallax image information to the two eyes independently, an image display device and a directivity generator which directs image information from the image display device to the left and right eyes respectively are necessary. For example, in a lenticular method which is the most popular method as the naked-eye stereopsis method, a lenticular lens array serves as the directivity generator and is combined with an image display device such as an LCD (Liquid Crystal Display) or PDP (Plasma Display Panel) to form a 3D image display device. The conventional naked-eye stereopsis method appears in various literatures and is known widely (non-patent reference 1).

With 3D image recognition with the two-eye parallax method, a contradiction occurs between a 3D image recognition position obtained by the focal point accommodative function of the eyes and that obtained by two-eye parallax. This often causes the observer to feel tired or somewhat different.

In recent years, a three-dimensional image producing method (3D image reproducing method) that is based on not only two-eye parallax but satisfies other 3D image sensing functions to give the live feeling more strongly has been proposed (patent references 1 to 3).

According to the method proposed by patent reference 1, a large number of small parallax images are presented in different directions at small angular pitches, so a plurality of parallax images enter the single eye of the observer. When the plurality of parallax images are presented to the single eye of the observer in this manner, focal point accommodation of the observer is guided to a 3D image position recognized by two-eye parallax to eliminate the contradiction in 3D image perception. Thus, the fatigue or sense of incompatibility of the observer is decreased.

Also, parallax variations (so-called motion parallax) with respect to the movement of the observation position of the observer can be expressed correctly to improve the quality of the 3D image totally. Such 3D display is called 3D display with a "super multi-view region" and is presented in various literatures (non-patent references 2 and 3).

Patent Reference 1

Japanese Patent Laid-Open No. 11-103474

Patent Reference 2

Japanese Patent Laid-Open No. 2002-287086

Patent Reference 3

Japanese Patent Laid-Open No. 2003-307709

Non-Patent Reference 1

Chihiro Masuda, "3D display", Sangyou Tosho K. K.

Non-Patent Reference 2

"Hologramlike video images by 45-view stereoscopic display", Proc. SPIE Vol. 3012, pp. 154-166, Stereoscopic Displays and Virtual Reality Systems IV (1997)

Non-Patent Reference 3

"3D display using intersection of light beams", Proc. SPIE Vol. 3957, pp. 215-224, Stereoscopic Displays and Virtual Reality Systems VII (2000)

Several methods are available in performing 3D image display well with the "super multi-view region". For example, to increase the number of small parallax images and to subdivide the presentation directions of parallax images is preferable in achieving stereopsis. When the presentation directions of the parallax images are to be subdivided, the resolution (number of pixels) of each parallax image degrades.

This problem will be explained with reference to patent reference 1.

FIG. 20 shows an arrangement disclosed in FIG. 6 of patent reference 1.

Referring to FIG. 20, a laser beam from a semiconductor laser 115 enters a scanning polygon mirror 117 through a lens system 116. The beam from the polygon mirror 117 enters a ray generator comprising an f·θ lens 118 and galvano mirror 121. The laser beam deflected by the galvano mirror 121 enters a first cylinder lens array 119 which deflects the incident beam in the main scanning direction at a deflecting angle that changes periodically in the main scanning direction depending on the incident position.

The laser beam deflected by the first cylinder lens array 119 enters a projection optical means comprising a second cylinder lens array 122 which diffuses the incident beam in the subscanning direction.

In this device, a semiconductor laser beam driving circuit 113 which modulates the driving current to the semiconductor laser 115 modulates the ray in a time series manner to correspond to the deflecting angle of the first cylinder lens array 119 to project a plurality of parallax images in the respective directions corresponding to their imaging directions. In this device, to increase the resolution of the 3D image on the display surface so as to improve the quality of the 3D image, the period of a change in deflecting angle of the first cylinder lens array 119 in the main scanning direction must be shortened.

To shorten the period of the change in deflecting angle of the first cylinder lens array 119 leads to decrease the pitches (the width of one lens array) of the first cylinder lens array 119. Consequently, as shown in FIG. 22 of patent reference 2, the laser ray which passes through the lens array is largely influenced by the diffusion by the lens.

SUMMARY OF THE INVENTION

It is an object of the present invention to provide a 3D image display device that can present a large number of small parallax images in a large number of directions at small angular pitches, which is required to realize stereopsis with a high-quality super multi-view region.

An example of a 3D image display apparatus to implement the above object comprises a ray modulator which emits a directive ray in a time series manner based on parallax image information, a scanner which deflects the ray from the ray modulator and scans a predetermined plane two-dimensionally with the deflected ray, a light emitting point distributor which is arranged on a light emission side of the scanner to form a plurality of light emitting points, and a light emitting point multiplexer which is arranged on the light emission side of the light emitting point distributor to form a plurality of secondary light emitting points with rays from individual ones of the light emitting points.

Further features of the present invention will become apparent from the following description of exemplary embodiments (with reference to the attached drawings).

BRIEF DESCRIPTION OF THE DRAWINGS

FIGS. 16A and 16B are schematic views of 3D image display apparatuses having time light emitting point multiplexers according to the fourth embodiment of the present invention;

DESCRIPTION OF THE EMBODIMENTS

First, the basic concept of stereopsis in the 3D image display apparatus according to the present invention will be explained. The 3D image display apparatus of the present invention effectively implements 3D image display (3D display) with the "super multi-view region". 3D display in this case refers to display with which a plurality of different images are observed by the observer substantially simultaneously so the observer can recognize a 3D image, and does not necessary refer to actual display of a 3D image. "Substantially simultaneously" can naturally be simultaneous, or need not be simultaneous as far as afterimage remains for the observer within the time referred to. More specifically, "simultaneous" can include a time difference if it falls within 1/60 sec.

A basic arrangement that implements 3D display with the "super multi-view region" will be described with reference to FIGS. 1A and 1B.

In the arrangement that implements 3D display with the "super multi-view region", a plurality of (preferably three or more) small parallax images are presented in a plurality of different directions at small angular pitches, and a plurality of small parallax image information beams intersecting in a space enter the single eye of the observer simultaneously.

Figure 1A:
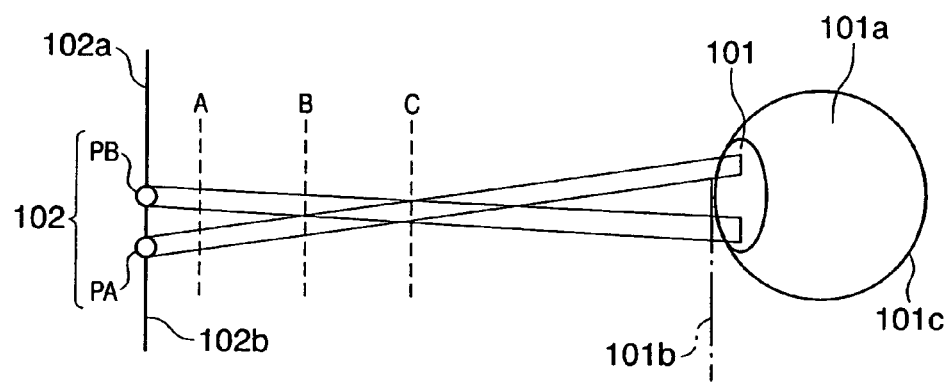
FIGS. 1A and 1B are views for explaining super multi-view stereopsis.
Figure 1B:
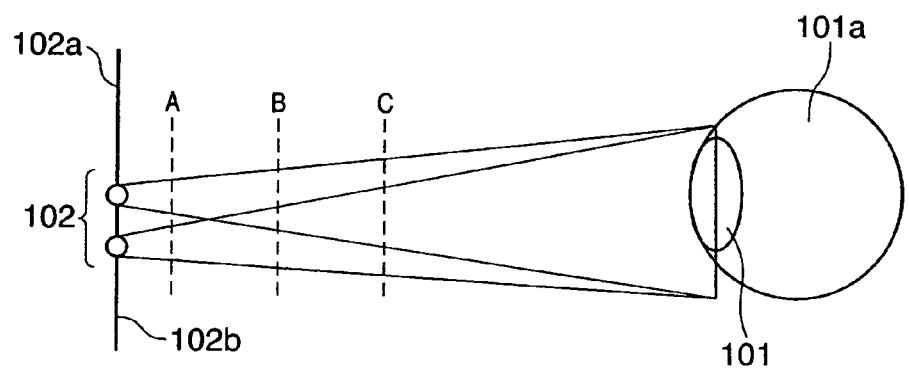

FIGS. 1A and 1B show a state wherein a beam based on the plurality of (two) small parallax image information simultaneously enter a single eye (pupil surface) 101 of an observer 101a.

When comparing FIGS. 1A and 1B, FIG. 1A shows a case in which light from each smallest display unit 102 (generally called a pixel) of image information 102a has high directivity and FIG. 1B shows a case in which it does not.

In FIG. 1A, light from the pixel 102 has high directivity to keep the same beam diameter as that of the original pixel even when it reaches the single eye 101 of the observer, and enters the single eye 101 in the form of ray. In this case, the observer 101a cannot obtain from the ray itself a clue concerning the depth that specifies the exit position of the ray. This is because since the sectional area of the ray does not largely change between a pixel position 102b and an observer position 101b, on whichever position the eye 101 may focus, the defocus amount of a retina image 101C does not change.

When a plurality of rays enter the single eye 101 at different angles, however, the eye tends to accommodate to an intersection position C of the rays. This is because when the eye is focused on the intersection position C of the rays, the area of the retina image 101C becomes the smallest, i.e., the defocus amount of the retina image 101C becomes the smallest. This is apparent when checking the sectional areas of the beams on planes A, B, and C in FIG. 1A.

Therefore, when light from the pixel 102 is in the "ray" having high directivity and a plurality of such "rays" enter the single eye 101 simultaneously, the eye of the observer 110a can be focused on the intersection position C of these rays.

The observer then recognizes that an image is present at the intersection position C.

As shown in FIG. 1B, if light from the pixel 102 has low directivity, when the light reaches the single eye 101 of the observer 101a, the diameter of the beam enlarges to several times or more the diameter of the original pixel 102. Hence, when the light enters the single eye 101 in the form of diffused light, the eye 101 of the observer 101a can readily be focused on the pixel position 102b. This is because the sectional area of the beam is the smallest at the pixel position 102b.

Therefore, even when a plurality of rays enter the single eye 101 at different angles, it is difficult to focus the eye of the observer on the intersection position of the rays B and C. This is apparent when checking the sectional areas of the beams on planes A, B, and C in FIG. 1B.

Therefore, as shown in FIG. 1B, when light from the pixel 102 is "diffused light" having low directivity, even if a plurality of light fluxes enter the single eye 101 simultaneously, it is difficult to focus the eye of the observer on the intersection points B and C of the rays.

On the basis of the above discussion, to implement 3D display with the "super multi-view region", the following four means or states are necessary:
(a) a "directional ray generator" which generates a ray having high directivity;
(b) a "ray deflector" which emits a plurality of rays in different directions at small angular pitches;
(c) a "ray modulator" which imparts optical information (intensity, color, and the like) which reflects the parallax image information in accordance with the emerging angle of the ray to each ray independently; and
(d) a "high-density distributed state of light emitting points" in which the light emitting points of rays seen from the observer are distributed with a high density to such a degree that they can be regarded as the pixels of image information.

The basic arrangement for displaying a 3D image with the super multi-view region will be described.

Figure 2:
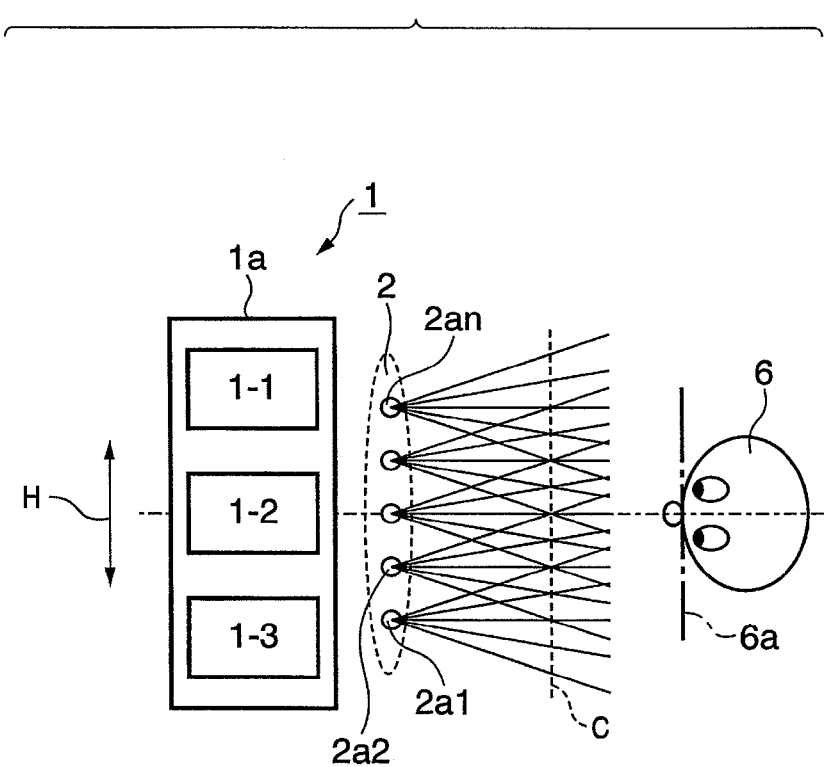
FIG. 2 is a schematic view of a conventional 3D image display apparatus.

FIG. 2 is a view for explaining the basic arrangement that implements 3D image display with the "super multi-view region".

A 3D image display apparatus 1 has a display 1a having three portions, i.e., a directional ray generator 1-1 ray deflector 1-2, and ray modulator 1-3. The directional ray generator 1-1 generates a high-directivity beam the sectional area of which does not largely change until an observation position 6a of an observer 6, i.e., a ray. The ray deflector 1-2 provides exit angles which are different for the respective rays. The ray modulator 1-3 imparts optical information (intensity, color, and the like) which reflects parallax image information to the respective rays independently of each other. The above three means may be summed up into two or one according to their functions. With this arrangement, the 3D image display apparatus 1 outputs high-directivity rays imparted with arbitrary optical information in different directions at small angular pitches. At this time, the 3D image display apparatus 1 forms a light emitting portion array (to be referred to as a "light emitting point array" hereinafter) in which a plurality of light emitting portions (to be referred to as "light emitting points" hereinafter) which form light emitting points that emit rays are arrayed.

More specifically, the 3D image display apparatus 1 forms a light emitting point array 2 in which a plurality of light emitting points 2a1 to 2an which emit rays are arrayed in one direction. The light emitting point array 2 has a high density to such a degree that it can be regarded as pixels of image information when the observer 6 sees it. Therefore, when the observer 6 sees the 3D image display apparatus 1, although he can recognize the image, if he changes the observation position (observation direction), rays imparted with different parallax image information enter the eye depending on the observation positions (ray emitting angles). Therefore, the observer 6 can also recognize parallax variations (so-called motion parallax) with respect to the movement of the observation position.

The interval among the rays which reach the observer position 6a is set to less than the eye pupil diameter. Thus, the 3D image display apparatus 1 can focus the eye on the intersection position C of the rays, that is, enables stereopsis with the super multi-view region by the observer.

Practical examples of 3D display with the super multi-view region will be described.

First, a parallax barrier method will be described.

According to the parallax barrier method, an aggregate called a parallax barrier in which a plurality of vertically long slit openings are arrayed in the lateral direction (horizontal direction) is arranged in front of the image display surface to impart directivity to the image observation direction. The parallax barrier method is often employed in a general binocular 3D image display apparatus. This method can also be extended to 3D display with the super multi-view region.

Figure 3A:
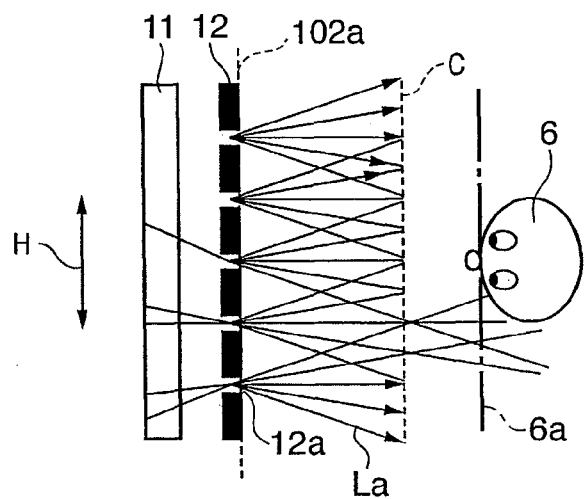
FIGS. 3A and 3B are views for explaining the principle of a conventional 3D image display apparatus which employs a parallax method.

FIG. 3A is a plan view of a method in which a parallax barrier 12 is arranged in front of an image display 11 and a plurality of directive rays are emitted in a horizontal direction H to present an image. The principle of performing 3D display with the super multi-view region according to this method will be described with reference to the partially enlarged view of FIG. 3B.

Figure 3B:
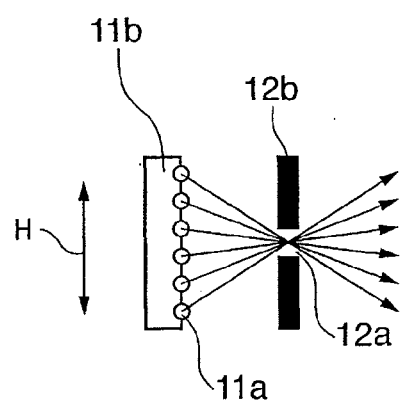

Pixels 11a serving as the smallest units of image expression of the image display (ray modulator) 11 are arrayed on a surface 11C of the image display 11 with a high density, as indicated by ○ in FIG. 3B, and respectively emit image information light having corresponding intensity and color. Of the beams from the image display 11, light that reaches the observer 6 is limited to light that has passed through a slit opening (light emitting point) 12a of the parallax barrier (light emitting point distributor) (light emitting portion distributor) 12. As the horizontal width of the slit opening 12a is sufficiently small, light that has passed through the slit opening 12a has high directivity and behaves like rays. Each ray emitting direction is uniquely determined by the relative positional relationship between the pixel 11a and slit opening 12a, and any rays are independent of each other. Namely, when super multi-view display is to be implemented by the parallax barrier method, the respective components have the following roles.

TABLE 1

| (Component) | (Role) |
| --- | --- |
| Slit opening 12a with small horizontal width | Directional ray generator (1-1) |
| Variation of relative positional relationship between pixel 11a on image display surface 11c and opening 12a in parallax barrier 12 | Ray deflector (1-2) |
| Image display 11 | Ray modulator (1-3) |
| Parallax barrier 12 in which slit openings 12a are arranged with high density | Light emitting point distributor |

The above arrangement, high ray directivity, and high resolution in the parallax image presenting direction enable 3D display with the super multi-view region.

The lenticular method will now be described.

According to the lenticular method, an aggregate called a lenticular lens in which a plurality of vertically long cylindrical lenses are arrayed in the lateral direction (horizontal direction) is arranged in front of the image display surface to impart directivity to the image observation direction. The lenticular method is often employed in a general binocular 3D image display apparatus. This method can also be extended to 3D display with the super multi-view region.

Figure 4A:
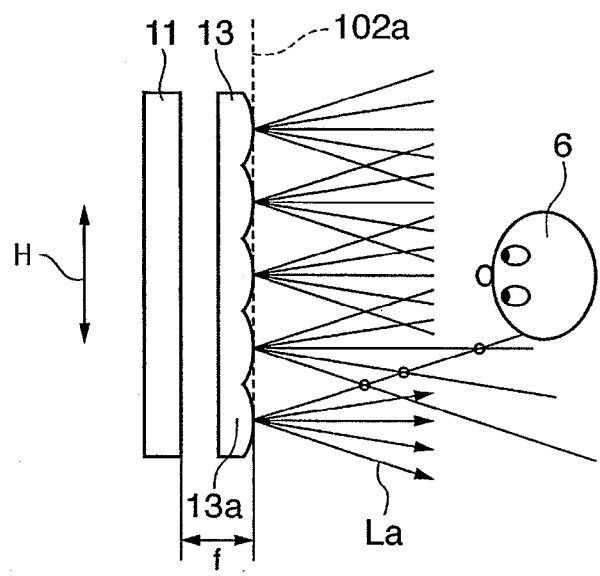
FIGS. 4A and 4B are views for explaining the principle of a conventional 3D image display apparatus which employs a lenticular method.

FIG. 4A is a plan view of a method in which a lenticular lens (light emitting point distributor) 13 is arranged in front of an image display (ray modulator) 11 and a plurality of directive rays are emitted in a horizontal direction H to present an image.

The principle of performing 3D display with the super multi-view region according to this method will be described with reference to the partially enlarged view of FIG. 4B.

Figure 4B:
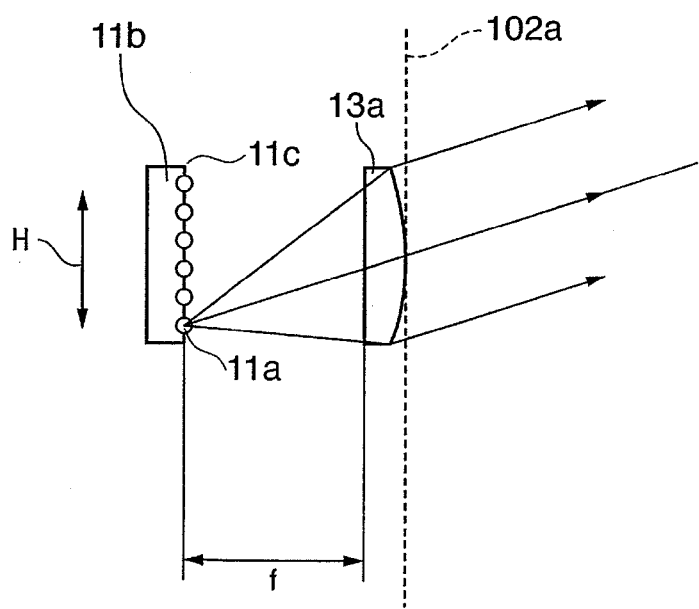

Pixels 11a serving as the smallest units of image expression of the image display 11 are arrayed on a surface 11C of the image display 11 with a high density, as indicated by ○ in FIG. 4B, and respectively emit image information light having corresponding intensity and color. Each image information light enters the lenticular lens 13. The emitting direction of the light is uniquely determined by the relative positional relationship between the pixel 11a and lenticular lens 13. The image display 11 is arranged spaced apart from the lenticular lens 13 by almost a focal length f of each of cylindrical lenses (light emitting points) 13a that form the lenticular lens 13, and the lenticular lens 13 emits substantially parallel light. In other words, light that has passed through the lenticular lens 13 has high directivity and behaves like rays. Each ray emitting direction is uniquely determined by the relative positional relationship between the pixel 11a and corresponding cylindrical lens 13a, and any rays are independent of each other. Namely, when super multi-view display is to be implemented by the lenticular method, the respective components have the following roles.

TABLE 2

| (Component) | (Role) |
| --- | --- |
| Each of cylindrical lenses 13a that form lenticular lens 13 | Directional ray generator (1-1) |
| Variation of relative positional relationship between pixel 11a on image display surface 11C and lenticular lens 13 | Ray deflector (1-2) |
| Image display 11 | Ray modulator (1-3) |
| Lenticular lens 13 in which cylindrical lenses 13a are arrayed with high density | Light emitting point distributor |

The above arrangement, high ray directivity, and high resolution in the parallax image presenting direction enable 3D display with the super multi-view region.

The beam deflecting method will now be described.

In the lenticular method shown in FIG. 4A, the plurality of cylindrical lenses 13a are arranged in front of the image display 11 so the image observation direction has directivity.

In contrast to this, according to the beam deflecting method, with directive beam scanning and beam intensity modulation in synchronism with the scanning, a parallax image corresponding to the image display 11 is replaced by formation of light spatial intensity distribution on a predetermined plane 16a.

Figure 5A:
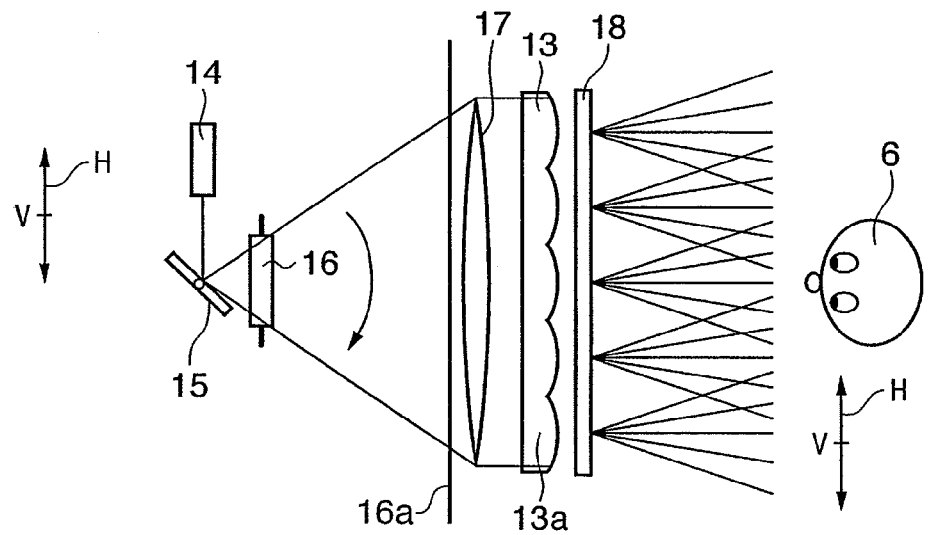
FIGS. 5A and 5B are views for explaining the principle of a conventional 3D image display apparatus which employs a beam deflecting method.

FIG. 5A is a plan view showing the idea of beam deflecting method. Referring to FIG. 5A, reference numeral 14 denotes a beam source which generates a beam, and has a beam intensity modulating mechanism. The beam generated by the beam source 14 is deflected by a horizontal beam scanner 15 and vertical beam scanner 16 to scan a predetermined plane two-dimensionally.

In synchronism with the scanning operations, if the intensity of the beam is modulated by the beam source 14 in a time series manner, a light spatial intensity distribution can be formed.

According to the beam deflecting method, the beam source 14 as described above is combined with a lenticular lens 13 to form a 3D image display apparatus with a super multi-view region.

Referring to FIG. 5A, reference numeral 17 denotes a collimator lens. A horizontal component H of light that has entered the collimator lens 17 is defined as substantially parallel light.

Figure 5B:
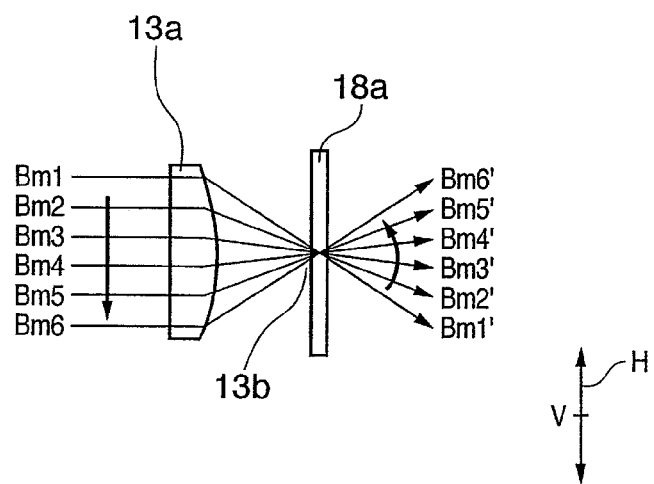

Therefore, the horizontal component of any beam vertically enters the lenticular lens (light emitting point distributor) 13 arranged on the right side (light emitting side) of the collimator lens 17. The behavior of the beam after entering the lenticular lens 13 will be described with reference to the enlarged view of FIG. 5B. A beam that vertically enters a corresponding one of element lenses (cylindrical lenses) (light emitting points) 13a which form the lenticular lens 13 is scanned constantly to change its incident position on the cylindrical lens 13a from, e.g., a position Bm1 to Bm2, Bm3, . . . , and Bm6 in FIG. 5B. As these beams are all vertical incident light, after they are emitted from the cylindrical lens 13a, they are focused on a focal point 13b of the cylindrical lens 13a and then form independent beams again and are emitted in respective directions Bm1', Bm2', . . . , and Bm6'. Each emitting direction is uniquely determined by the incident position on the cylindrical lens 13a, and all rays are independent of each other.

When super multi-view display is to be implemented by the beam deflecting method, the respective components have the following roles.

TABLE 3

| (Component) | (Role) |
| --- | --- |
| Scanners 15 and 16, collimator lens 17, lenticular lens 13 | Directional ray generator (1-1) |
| Variation of incident position on lenticular lens 13 | Ray deflector (1-2) |
| Modulator provided to beam source 14 | Ray modulator (1-3) |
| Lenticular lens 13 in which cylindrical lenses 13a are arrayed with high density | Light emitting point distributor |

The above arrangement, high ray directivity, and high resolution in the parallax image presenting direction enable 3D display with the super multi-view region.

According to the beam deflecting method, if a unidirectional light diffusion plate 18 which diffuses light in only a vertical direction V is arranged at the focal point 13b of the lenticular lens 13, the observation range in the vertical direction V can be enlarged. This is an information reducing means that utilizes the fact that the sensitivity of 3D recognition by the observer is strong in the horizontal direction H in which two eyes line up and weak in the vertical direction V.

Namely, this method is effective as a method of discarding parallax information in the vertical direction V and ensuring the observation range in the vertical direction.

When the unidirectional light diffusion plate 18 is arranged at the focal point 13*b* of the lenticular lens 13, as described above, the aggregate of beam focusing points formed on the unidirectional light diffusion plate 18 is regarded as "pixels" by the observer 6. The resolution of the pixels serves as the resolution of each parallax image to be observed.

The first embodiment of the present invention will be described.

A method of performing 3D display with the super multi-view region has been described above. The present invention provides a device and method of allowing observation of 3D display with the super multi-view region described above with higher accuracy or higher continuity. A practical example of the first embodiment will be described.

Figure 6:
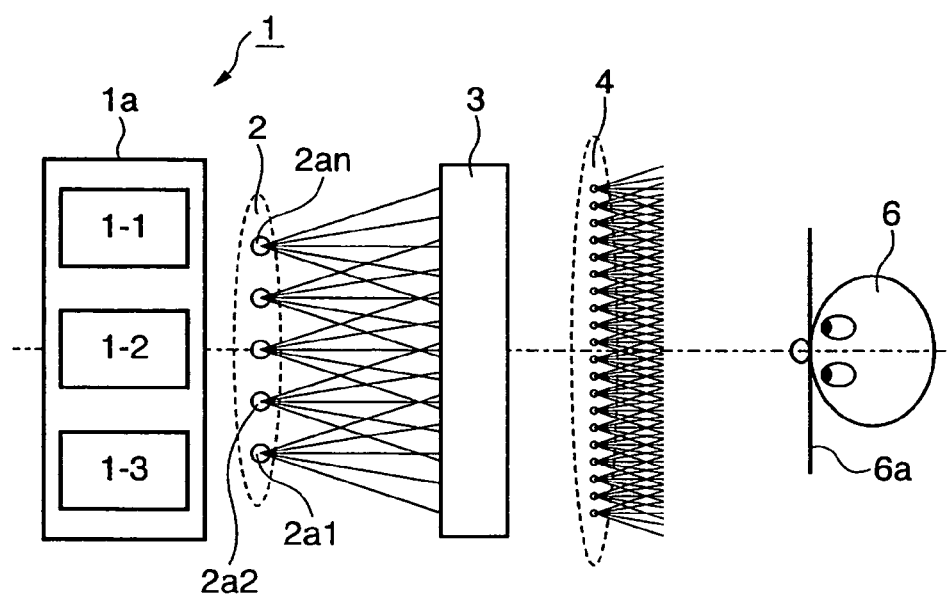
FIG. 6 is a schematic view of the basic arrangement of the first embodiment of the present invention.

FIG. 6 is a schematic view of the basic arrangement of the first embodiment of the present invention. A 3D image display apparatus 1 has three portions, i.e., a directional ray generator 1-1, ray deflector 1-2, and ray modulator 1-3. The directional ray generator 1-1 generates a high-directivity beam the sectional area of which does not largely change until an observation position, i.e., a ray. The ray deflector 1-2 provides exit angles that are different for the respective rays. The ray modulator 1-3 imparts optical information (intensity, color, and the like) which reflects parallax image information to the respective rays independently of each other. The above three means may be summed up into two or one means depending on their functions. With this arrangement, the 3D image display apparatus 1 can output high-directivity rays imparted with arbitrary optical information in different directions at small angular pitches.

At this time, the 3D image display apparatus 1 forms a light emitting portion array 2 in which a plurality of light emitting points 2*a*1 to 2*a*n which emit rays are arrayed in one direction. The light emitting point array 2 has a high density to such a degree that it can be regarded as pixels of image information when an observer 6 sees it.

So far the arrangement is identical to that of the conventional 3D image display apparatus with the super multi-view region of FIG. 2.

The characteristic feature of this embodiment resides in that it has a light emitting point multiplexer (light emitting portion multiplexer) 3 to multiply the light emitting point array 2 such that the light emitting point array 2 forms images in one direction so as not to superpose each other spatially, and in that a plurality of secondary light emitting points are formed from one light emitting point so as to form a higher-density light emitting point array (high-density light emitting portion array) 4. With the light emitting point multiplexer 3, light is emitted from the high-density light emitting point array 4 in different directions at small angular pitches while maintaining high directivity. Therefore, in the same manner as in the conventional super multi-view display device, if the observer changes the observation position (observation direction), rays imparted with different parallax image information enter the eye depending on the observation position (ray emitting angle). Therefore, the observer can also recognize parallax variations (so-called motion parallax) with respect to the movement at the observation position.

The plurality of secondary light emitting points which are formed based on rays from one light emitting point are formed at different positions at different timings (preferably with a small time difference within 1/60 sec).

The interval among the rays which reach an observer position 6*a* is set to less than the eye pupil diameter. Thus, the 3D image display apparatus 1 can guide the focal point accommodation of the eye to the intersection position (the position C in FIGS. 1A and 1B) of the rays, that is, enables stereopsis with the super multi-view region by the observer.

Furthermore, according to this embodiment, the high-density light-emitting point array 4 to be recognized by the observer 6 has a high density due to the light emitting point multiplexer 3. When the observer 6 sees the 3D image display apparatus 1, he can recognize the high-density light emitting point array 4 as the pixels of a high-resolution image.

The arrangement of the light emitting point multiplexer 3 will be described. As the light emitting point multiplexer 3, two multiplexers, i.e., a spatial light emitting point multiplexer (spatial light emitting portion multiplexer) 3-1 (see FIG. 8) according to the first embodiment and a time light emitting point multiplexer (time light emitting portion multiplexer) 3-2 (see FIG. 11) according to the second embodiment can be used.

Either multiplexer can be effectively employed in this embodiment, and both multiplexers can be effectively employed simultaneously. This will be described hereinafter exemplifying practical examples.

Figure 8:
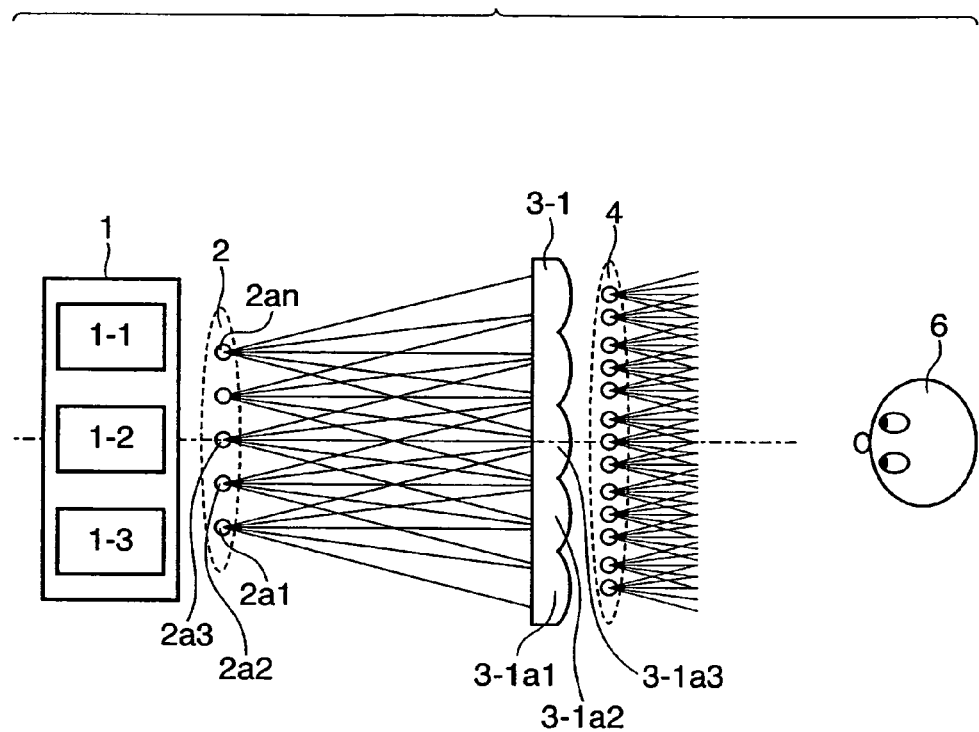
FIG. 8 is a schematic view of the first embodiment which employs a lenticular as a spatial multiplexer.

The spatial light emitting point multiplexer 3-1 according to the first embodiment will be described with reference to FIG. 8.

The spatial light emitting point multiplexer 3-1 refers to a multiplexer that multiplexes light emitting points by a spatial multiplexer.

According to this embodiment, the spatial light emitting point multiplexer 3-1 is aimed at multiplexing of light emitting points of rays, so an optical light path or image multiplexer can be employed as the spatial light emitting point multiplexer 3-1. Examples of such a multiplexer include a lens array, double refraction element, small opening array, diffraction grating array, and the like. FIG. 8 is a schematic view showing a spatial light emitting point multiplexer 3-1 that employs a lens array among these examples. As has been described with reference to FIG. 6, the 3D image display apparatus 1 forms the light emitting point array 2 of rays.

According to this embodiment, a lens array 3-1 is arranged as the spatial light emitting point multiplexer 3-1. The light emitting points formed in the light emitting point array 2 are multiplexed into a plurality of secondary light emitting points to form the high-density light emitting point array 4. It is significant that rays emitted from a plurality of light emitting points 2*a*1 to 2*a*n become incident on individual element lenses 3-1*a* of the lens array 3-1 simultaneously.

If such an arrangement is established, one lens 3-1*a* forms a plurality of light emitting point images. If this is achieved by a plurality of lenses, the high-density light emitting point array 4 is implemented.

Figure 9A:
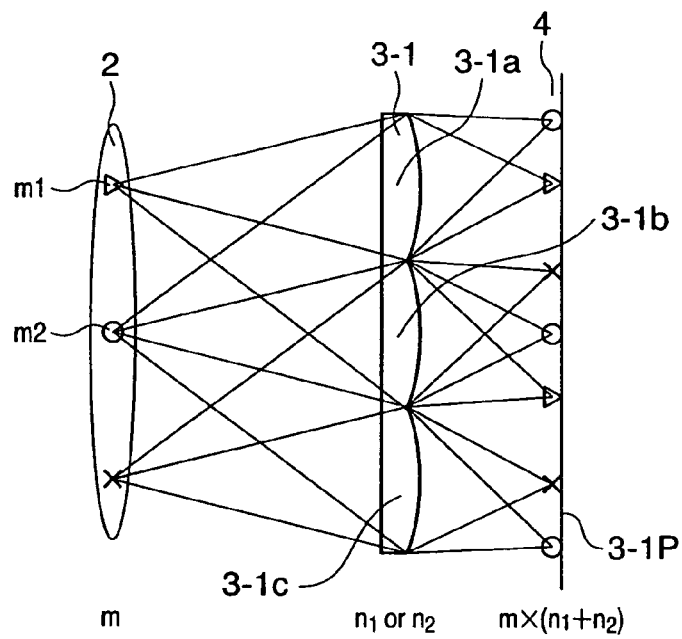
FIGS. 9A and 9B are views for explaining spatial light emitting point multiplexers.

For example, as shown in FIG. 9A, when rays emitted from one light emitting point m1 enter three element lenses 3-1*a*, 3-1*b*, and 3-1*c* of the lens array 3-1, the image of one light emitting point m1 is formed into three images (secondary light emitting points), so that triple light emitting point multiplexing is realized. In FIG. 9A, note that double light emitting point multiplexing occurs only at the farthest end.

Namely, when rays from m light emitting points respectively enter n element lenses of the lens array 3-1 simultaneously, each element lens can form n light emitting points on an image surface position 3-1P of the lens array 3-1.

Figure 9B:
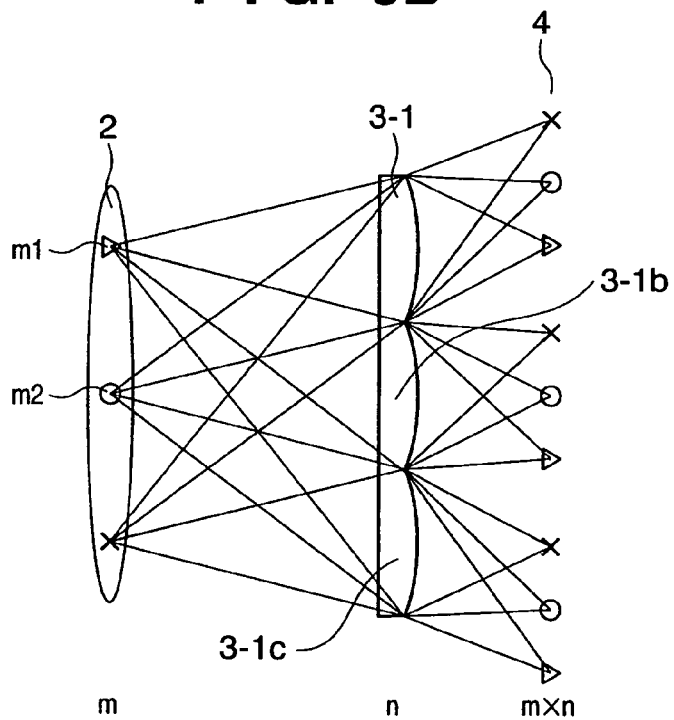
Figure 10:
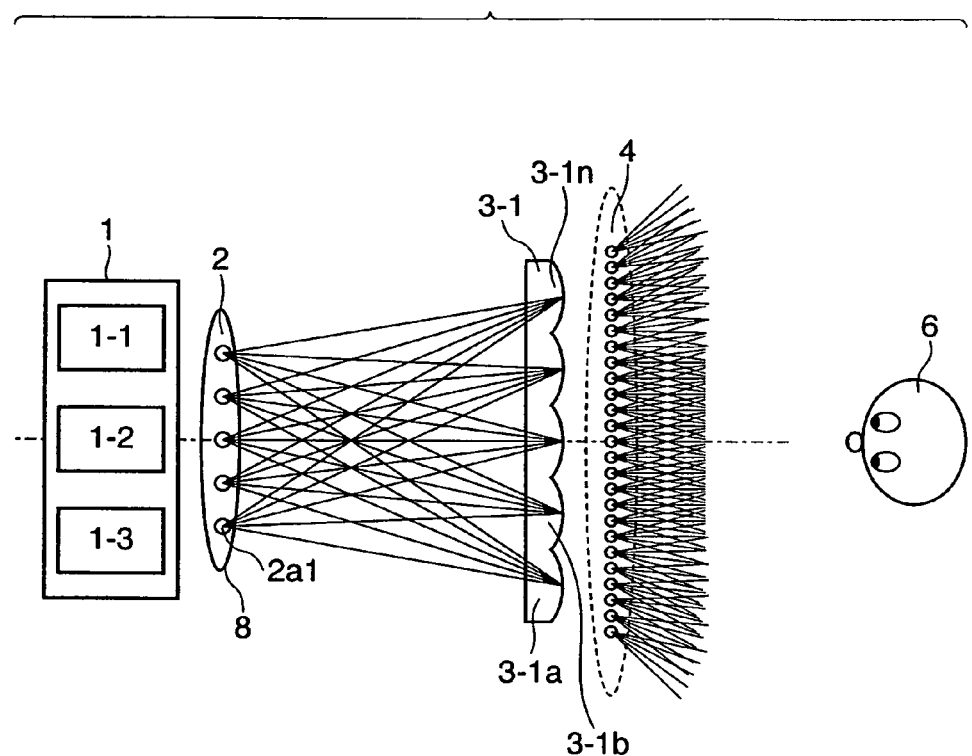
FIG. 10 is a schematic view of the first embodiment of the present invention which has a common projection plane.

Consequently, according to this embodiment, due to multiplexing, m light emitting points are multiplexed into 2×n1+(m−2)n2 (n1=2, n2=3). FIG. 10 shows a case in which the efficiency of light emitting point multiplexing is enhanced based on this fact. According to this embodiment, a field optical system 8 is arranged at a position where the first light emitting point array 2 is formed, and rays from one light emitting point become incident on all the element lenses 3-1a to 3-1n of the lens array 3-1. With this arrangement, multiplexing of the light emitting points is always performed by all the element lenses 3-1a, 3-1b, and 3-1c, as shown in FIG. 9B. As a result, the number m×n of images of the finally obtained light emitting points is obtained as the maximal value.

In this manner, the spatial light emitting point multiplexer 3-1 suffices as far as it optically multiplexes original m light emitting points n times depending on the ray incident position.

Figure 11:
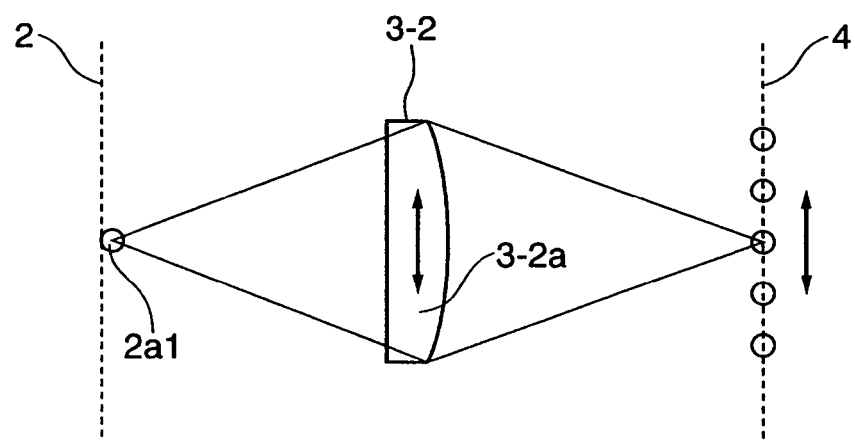
FIG. 11 is a view for explaining a time light emitting point multiplexer according to the second embodiment of the present invention.

The time light emitting point multiplexer 3-2 according to the second embodiment refers to a multiplexer that multiplexes light emitting points in a time manner. Examples of such a multiplexer include, e.g., an oscillation lens 3-2a as shown in FIG. 11. The oscillation lens 3-2a oscillates in a direction perpendicular to the optical axis, while keeping synchronism with light emitting point formation in a time series manner, to multiplex the image formation position of a light emitting point array 2, thus forming a high-density light emitting point array 4. For example, if t levels of lens positions can be taken during the process of oscillation and light emitting point formation can synchronize with all of the t levels, light emitting points which are multiplexed t times can be realized.

In either case, it is desirable that such light emitting point formation operations (lens oscillation periods) are done within a shorter period of time than the allowable afterimage time of the human eye and are recognized by the observer as phenomena that occur substantially simultaneously.

As the time light emitting point multiplexer, other than the oscillation lens 3-2a, the following multiplexers are available.

Figure 12:
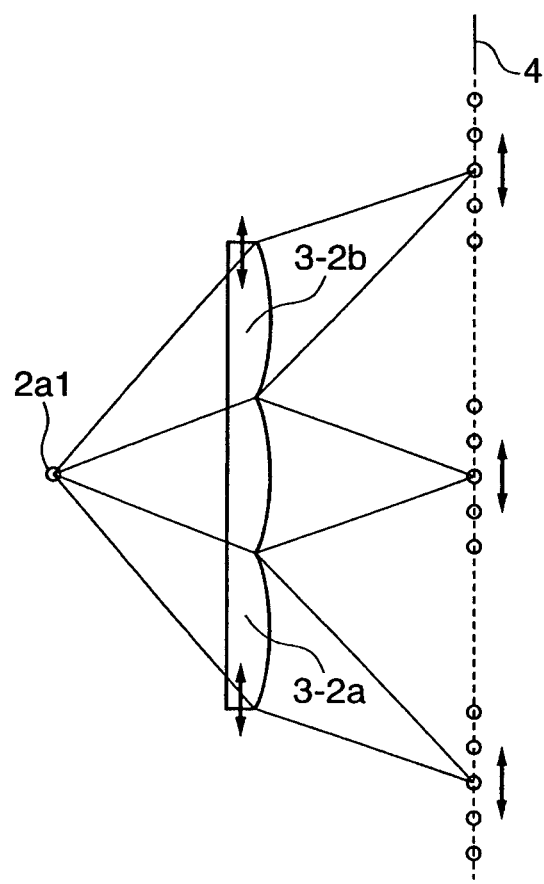
FIG. 12 is a view for explaining a time light emitting point multiplexer array.

First, as shown in FIG. 12, the lens 3-2a portion of FIG. 11 may be replaced with a lens array 3-2b to enhance the degree of light emitting point multiplexing. If t levels of positions can be taken in the n-column lens array 3-2b during the process of oscillation and light emitting point formation can synchronize with all of the t levels, the high-density light emitting point array 4 comprising light emitting points which are multiplexed n×t times at maximum can be implemented.

A time multiplexer can be similarly formed by optical elements that utilize reflection.

Figure 13A:
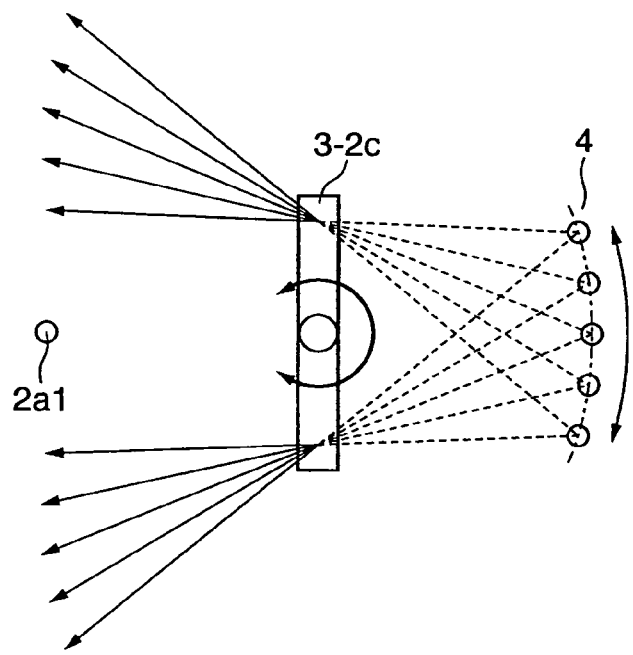
FIGS. 13A and 13B are views for explaining a time light emitting point multiplexer which employs a rotary mirror.
Figure 13B:
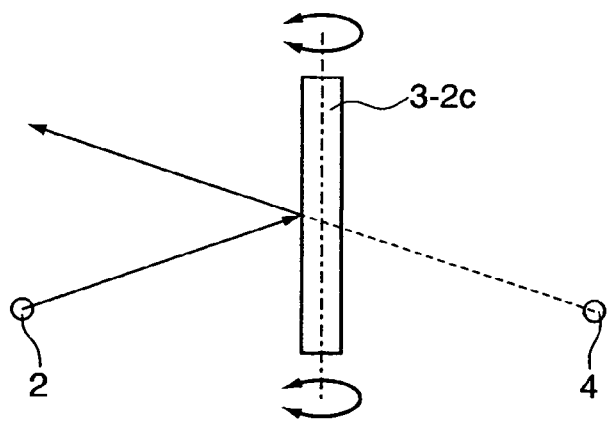

FIGS. 13A and 13B show light emitting point multiplexing by a rotary mirror 3-2c.

FIG. 13A is a plan view showing the relationship between the rotary mirror 3-2c and a light emitting point 2a1, and FIG. 13B is a side view of the same. The rotary mirror 3-2c rotates in a time series manner in synchronism with the light emitting point array 4 to multiplex the image formation positions of the light emitting points.

For example, if t levels of mirror angles can be taken during the process of motion and light emitting point formation can synchronize with all of the t levels, light emitting points which are multiplexed t times can be attained.

Naturally, the relationship between the direction of ray and the surface of the rotary mirror is not limited to the non-perpendicular relationship as shown in FIG. 13B. The incident ray with respect to the mirror surface and a reflected ray may be within one plane.

Figure 14:
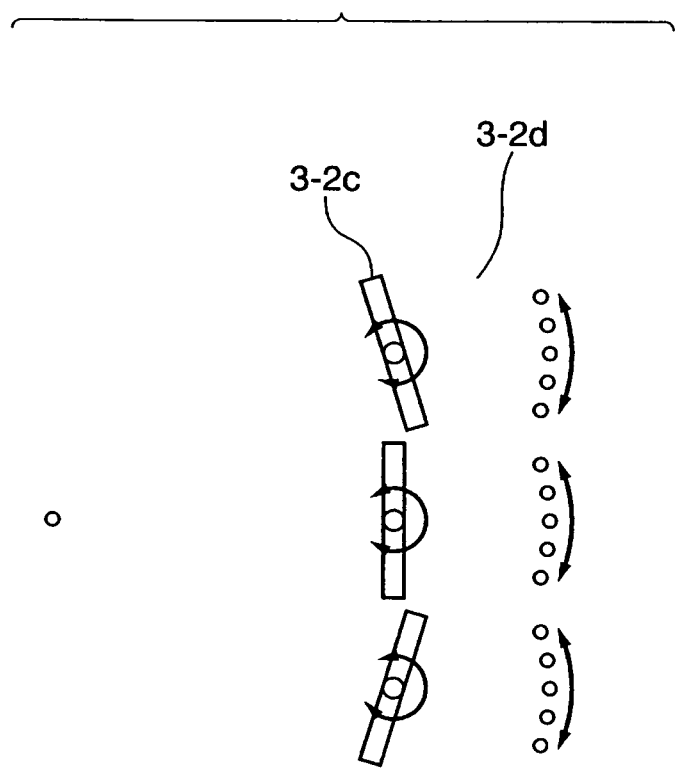
FIG. 14 is a view for explaining a time light emitting point multiplexer which employs a rotary mirror array.

Furthermore, as shown in FIG. 14, the rotary mirror 3-2c portion of FIGS. 13A and 13B may be replaced with a rotary mirror array 3-2d to enhance the degree of light emitting point multiplexing. If the n-column rotary mirror array 3-2d can take t levels of positions during the process of rotation (or oscillation) and light emitting point formation can synchronize with all of the t levels, light emitting points which are multiplexed n×t times at maximum can be realized.

In this manner, the time light emitting point multiplexer 3-2c suffices as far as it multiplexes the original m light emitting points n times during the allowable afterimage time of the observer.

An oscillation mirror may be employed in place of the rotary mirror.

To provide a light emitting point multiplexer as in the first and second embodiments has the following advantages.

<<The density light emitting points can be increased readily.>>

This will be explained exemplifying patent reference 3 referred to in the "DESCRIPTION OF THE RELATED ART".

In the above embodiment, when 3D display with a "super multi-view region" is to be performed, if the pinhole pitches of the micro-optical system array serving as the light emitting points are increased and a larger number of pinholes are set, a smoother 3D image with a wider observation region can be realized.

If the pinhole pitches are increased, the individual regions of a divisional image on the image display panel 101 corresponding to the pinholes must also be made small accordingly. If an image is projected on a unidirectional light diffusion optical element, the resolution of the image degrades. If a larger number of pinholes are set, the sizes of both the micro-optical system array and image display panel must be increased.

According to the first and second embodiments, the pitches and number of substantial light emitting array can be changed by the operation of the light emitting point multiplexer without changing the spatial feature of the light emitting point array such as the pinholes as described above.

<<The balance of the density of the light emitting points with the resolution of image information can be optimized.>>

This will be explained exemplifying patent reference 3 described above in the "DESCRIPTION OF THE RELATED ART". In the above embodiment, when 3D display with a "super multi-view region" is to be performed, the pinhole pitches of the micro-optical system array serving as the light emitting points must be increased and a larger number of pinholes must be set. When the resolution of the parallax image to be projected onto the unidirectional diffusion optical element is sufficiently high, a smooth, high-resolution 3D image with a wide observation region can be implemented.

When an actual device is built, the balance of the pinhole (light emitting point) pitches with the resolution of the parallax image may be impaired. In this case, as the pinhole pitches are related to the final observation pupil pitches and the resolution of the parallax image is related to the resolution and size of the image display panel, the actual device cannot always be designed freely.

According to the first and second embodiments, the pitches and number of substantial light emitting array can be changed by the operation of the light emitting point multiplexer without changing the specifications of the image display panel or the micro-optical system array, thereby selecting an optimal balance.

A more practical embodiment which employs a light emitting point multiplexer will be described.

Figure 15A:
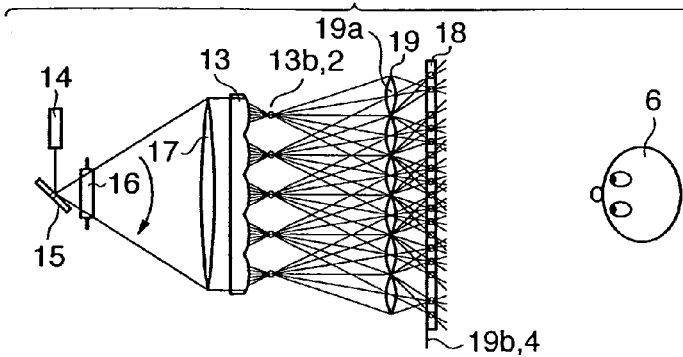
FIGS. 15A to 15C are schematic views of 3D image display apparatuses having time light emitting point multiplexers according to the third embodiment of the present invention.
Figure 15B:
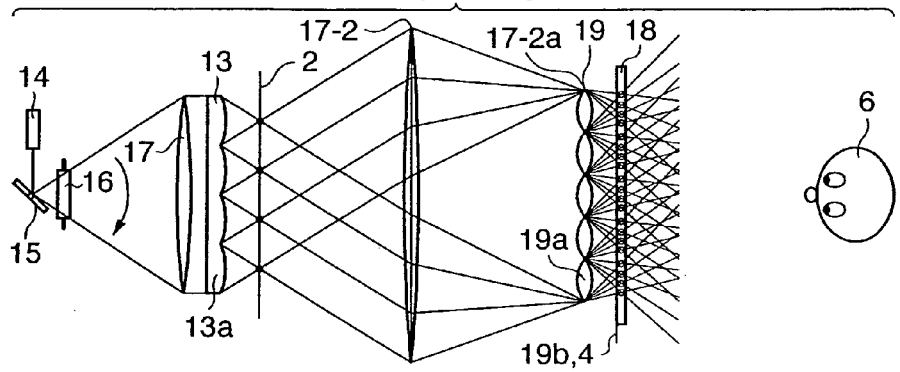
Figure 15C:
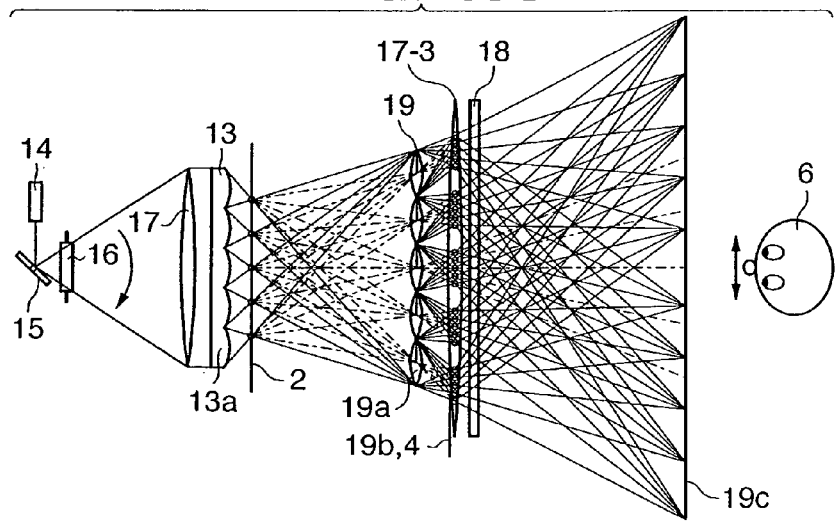

FIGS. 15A to 15C are schematic views of the third embodiment which employs the beam deflecting method and a spatial light emitting point multiplexer comprising a lens array.

When compared to the 3D image display apparatus employing the beam deflecting method described with reference to FIG. 5A, FIG. 15A is a view showing a case in which a spatial light emitting point multiplexer formed of a lens array 19 multiplexes light emitting points to form a high-density light emitting point array. The lens array 19 serving as the spatial light emitting point multiplexer is arranged with respect to rays emitted from the lenticular lens (light emitting point distributor) 13 as part of the 3D image display apparatus employing the beam deflecting method shown in FIG. 5A. The lens array 19 is arranged such that the rays from a plurality of lenticular elements enter its respective lenses 19a.

The 3D image display apparatus of FIG. 5A forms a light emitting point array 2 having m light emitting points.

When rays emitted from one light emitting point enter the n element lenses 19a of the spatial light emitting point multiplexer 19 in FIG. 15A, a light emitting point array 4 multiplexed by m×n is formed on an image surface position 19b of the lens array 19.

In the optical system of FIG. 15A, the emitting directions of the rays from the respective light emitting points formed by the spatial light emitting point multiplexer spread toward an observer 6. When observation is performed by regarding the high-density light emitting point array 4 as 3D image display pixels, the rays from the light emitting points may be partially eclipsed at the observation viewpoint. Consequently, the viewpoint position where 3D image observation can be performed well is limited.

When compared to the optical system of FIG. 15A, in FIG. 15B, a field lens 17-2 is introduced into an optical system, and a lenticular lens 13 and the field lens 17-2 form an afocal system. Rays are emitted at equal angles from the respective light emitting points 19b of the high-density light emitting point array 4 which are formed by the spatial light emitting point multiplexer 19.

The lenticular lens 13 and field lens 17-2 form the afocal system. A light emitting point array having light emitting points equal in number to the rays to enter each cylindrical lens 13a of the lenticular lens 13 is formed on a position 17-2a of rear focal plane of the field lens 17-2.

When a spatial light emitting point multiplexer (the lens array 19 in this case) is arranged as shown in FIG. 15B with respect to the light emitting point array as a physical plane, the high-density light emitting point array 4 can be additionally formed at the image surface position 19b of the spatial light emitting point multiplexer 19.

The high-density light emitting point array 4 formed in this manner forms a light emitting point array in which the relationship between the ray emitting angular pitches and the interval between the light emitting points of the light emitting point array formed on the position of rear focal plane of the field lens 17-2 is reversed. The emitting angular pitches of the constructed 3D image display apparatus are very fine while the interval between the light emitting points is large. In practice, the emitting angular pitches may be large. When, e.g., the light emitting point interval need be small, the light emitting point multiplexer 19 may be employed as described above, so that a 3D image display apparatus in which the relationship between the light emitting point interval and the emitting angular pitches or the balance of the number of light emitting points with the emitting angular range is adjusted can be constructed.

A unidirectional light diffusion plate 18 is inserted at the image surface position 19b of the lens array 19 to correspond to the position of the additionally formed high-density light emitting point array 4 to diffuse light in the vertical direction, so as to ensure the observation range in the vertical direction. When the rays are emitted at the equal angle from the high-density light emitting point array 4 which is multiplexed by the spatial light emitting point multiplexer 19, the problem of eclipse of the rays is moderated. Namely, a wider viewpoint where the 3D image can be observed without causing eclipse of the rays from larger number of light emitting points, i.e., a wider viewpoint where the 3D image can be observed well without causing eclipse, can be obtained.

When compared to the optical system of FIG. 15A, in FIG. 15C, a field lens 17-3 is introduced. This provides an optical system in which the emitting directions of rays from the respective light emitting points of the high-density light emitting point array 4, which is formed by the spatial light emitting point multiplexer 19, are controlled to focus on a certain viewpoint position.

The rays from the light emitting point array 2 which is formed of the lenticular lens 13 are multiplexed by the lens array 19 serving as the spatial light emitting point array. The field lens 17-3 is inserted at the image surface position 19b of the high-density light emitting point array 4. When the field lens 17-3 is introduced, the emitting directions of rays which have passed through the respective element lenses 13a to form the respective light emitting point groups focus on one certain point in the observation range. Consequently, as in the vicinity of the viewpoint position 19c of FIG. 15C, all the rays emitted from the light emitting points at the respective positions of the corresponding element lenses 13a can be adjusted to intersect in the horizontal direction at one certain point in the observation range.

This provides an optical system in which viewpoints where rays containing image information on the 3D image in the wider range enter the eye can be ensured within a wider range.

Figure 7:
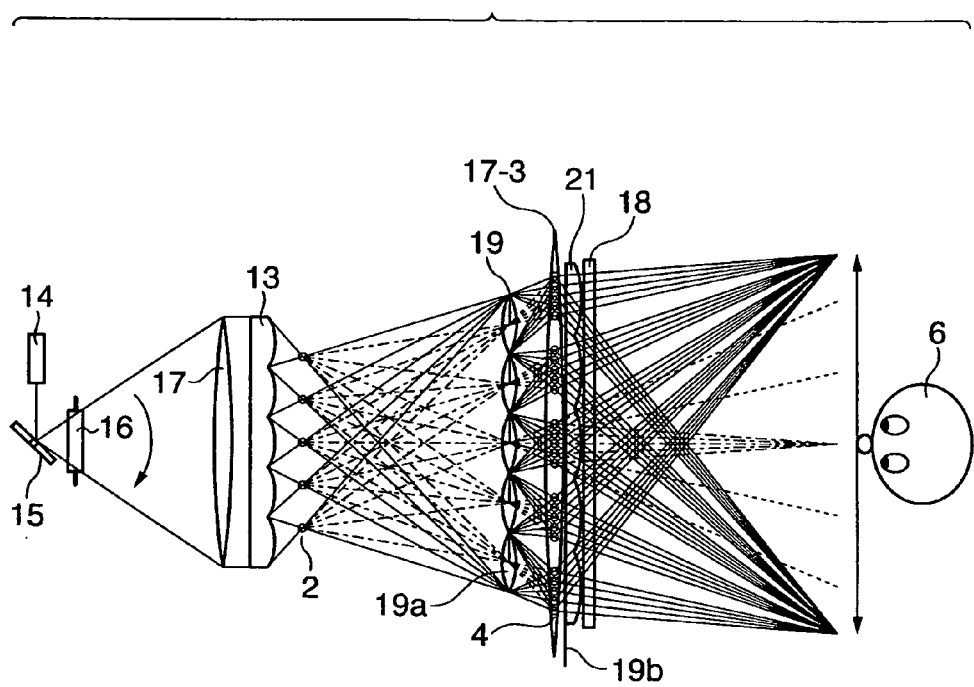
FIG. 7 is a schematic view of a 3D image display apparatus having a spatial ray multiplexer according to the third embodiment of the present invention.

FIG. 7 shows an optical system in which a field lens, e.g., a lenticular lens 21, comprising a periodical optical element is introduced at the position of the field lens 17-3 of FIG. 15C so as to maximize the common region. The periodical lenticular lens 21 is inserted at an image surface position 19b of a spatial light emitting point multiplexer 19. Thus, the emitting directions of each of the light emitting points corresponding to the respective element lenses 19a of the spatial light emitting point multiplexer 19 are controlled more finely to maximize the common range of the viewpoint of the observer.

The above three optical elements, i.e., the field lens 17-3, lens array 19, and unidirectional light diffusion plate 18 may be summed up into one or two elements depending on their functions. Alternatively, the three optical elements may be replaced with other elements having equivalent functions.

As described above, the light emitting point multiplexer 19 is introduced to the light emitting points which are formed by the conventional 3D image display apparatus with the super multi-view region. Thus, the high directivity of the rays to be emitted and the ray emitting directions at small angular pitches are maintained, and 3D image display having a larger number of pixels with a narrower light emitting point interval is realized.

FIGS. 16A and 16B are schematic views of the fourth embodiment which employs the beam deflecting method and a spatial light emitting point multiplexer comprising an oscillation lens.

FIG. 16A is a view showing a 3D image display apparatus which uses the oscillation lens 3-2a described with reference to FIG. 11 and oscillates it in synchronism with light emitting point formation in a time series manner to multiplex the image formation positions of the light emitting points.

A time light emitting point multiplexer 20 acts on a high-density light emitting point array 4 which is formed by the 3D image display apparatus employing the beam deflecting method described with reference to FIG. 5A. In FIG. 16A, the oscillation lens 20 takes three levels of lens positions to practice multiplexing. Thus, the high-density light emitting point array 4 which is multiplexed three times can be realized.

As the light emitting point formation operations (lens oscillation periods) are done within a shorter period of time than the allowable afterimage time of the human eye, they are recognized by an observer 6 as phenomena that occur substantially simultaneously.

FIG. 16B is a schematic view in which the beam deflecting method and a spatial light emitting point multiplexer which comprises an oscillation lens array are employed.

FIG. 16B shows the arrangement of an optical system in which the oscillation lens 20 in FIG. 16A is replaced with an oscillation lens array 24 employing a plurality of oscillation lenses 20 to increase the degree of light emitting point multiplexing.

Rays from one light emitting point enter a plurality of lens array elements 24a to form the plurality of light emitting point images 4, and the lens array 24 is oscillated in synchronism with light emitting point formation in the time series manner to multiplex the light emitting points. This realizes higher-density light emitting point multiplexing.

Figure 17A:
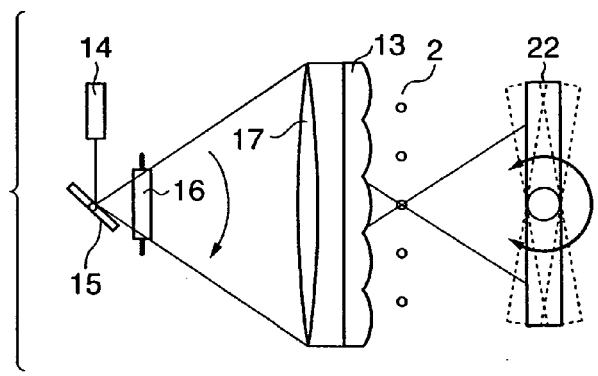
FIGS. 17A to 17C are schematic views of a 3D image display apparatus having a rotary mirror type time light emitting point multiplexer according to the fourth embodiment of the present invention.
Figure 17B:
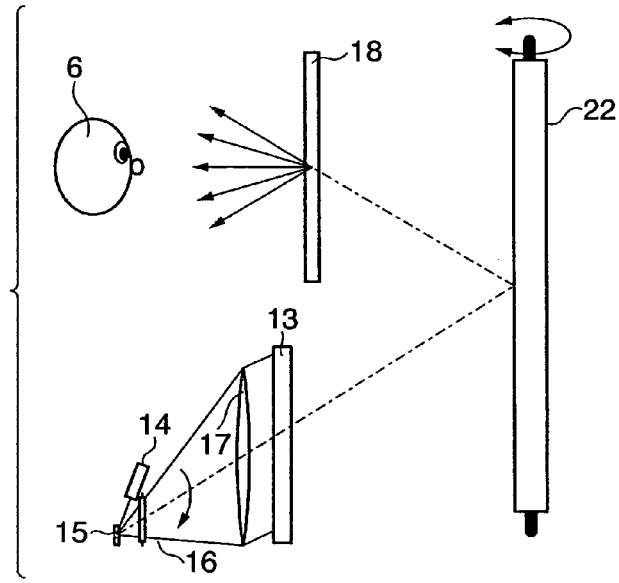
Figure 17C:
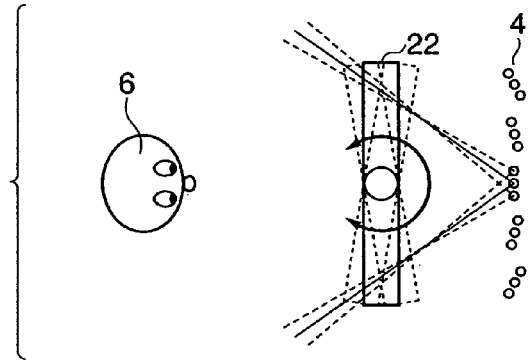

FIGS. 17A to 17C are schematic views of the fourth embodiment which employs the beam deflecting method and a time light emitting point multiplexer comprising a rotary mirror.

FIG. 17A is a plan view showing a 3D image display apparatus which uses the rotary mirror 3-2c described with reference to FIG. 13 and oscillates it in synchronism with light emitting point formation in a time series manner to multiplex the image formation positions of light emitting points 2.

FIG. 17B is a side view of the 3D image display apparatus of FIG. 17A. The incident ray and the rays which are reflected by a rotary mirror 22 need not be on the same plane, as shown in FIG. 17B. FIG. 17C shows the relationship between the light emitting point array 4 as a virtual image and the observer 6 after the rays are reflected by the rotary mirror 22.

When the mirror 22 rotates, the position of the light emitting point array 4 as the virtual image moves. Thus, the number of apparent light emitting points increases and the light emitting point interval decreases. If t levels of mirror positions can be taken during rotation and light emitting point formation can synchronize with all of the t levels, light emitting points multiplexed in t levels are formed.

Figure 18A:
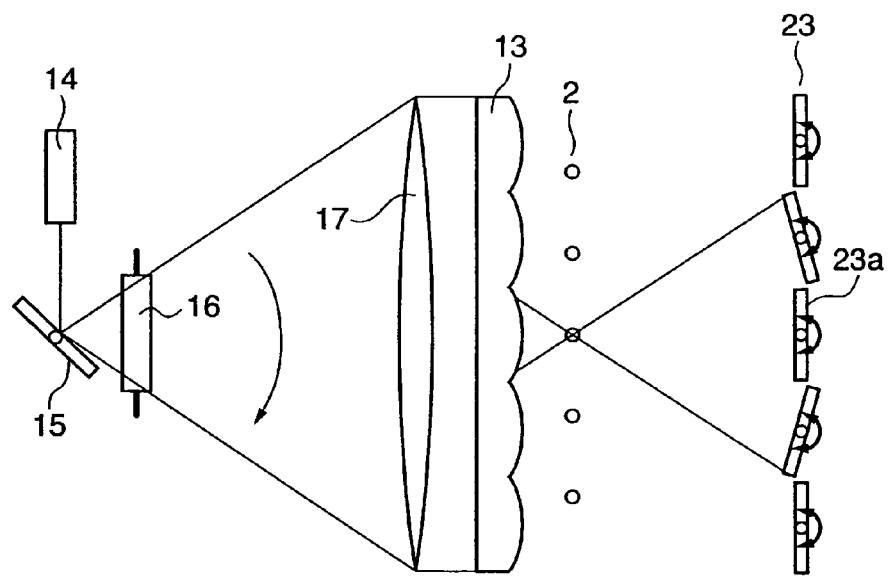
FIGS. 18A and 18B are schematic views of a 3D image display apparatus having a rotary mirror array type time light emitting point multiplexer according to the fourth embodiment of the present invention.
Figure 18B:
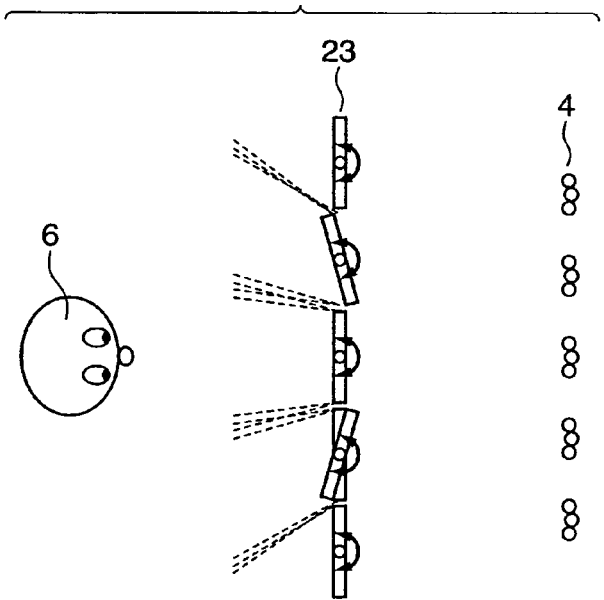

FIGS. 18A and 18B are schematic views of the fourth embodiment which employs the beam deflecting method and a time light emitting point multiplexer comprising a rotary mirror array.

FIG. 18A shows a state in which the rotary mirror 22 in FIG. 17A is replaced with a rotary mirror array 23 to enhance the degree of light emitting point multiplexing.

As individual mirror elements 23a can be rotated independently of each other, spatial multiplexing and time multiplexing of the light emitting points can be realized simultaneously.

If a larger 3D image is to be displayed, it may be implemented by arraying 3D image display apparatuses of the present invention by tiling. In this case, the field optical system may be eccentric so a 3D image observation region can be obtained appropriately.

Figure 19:
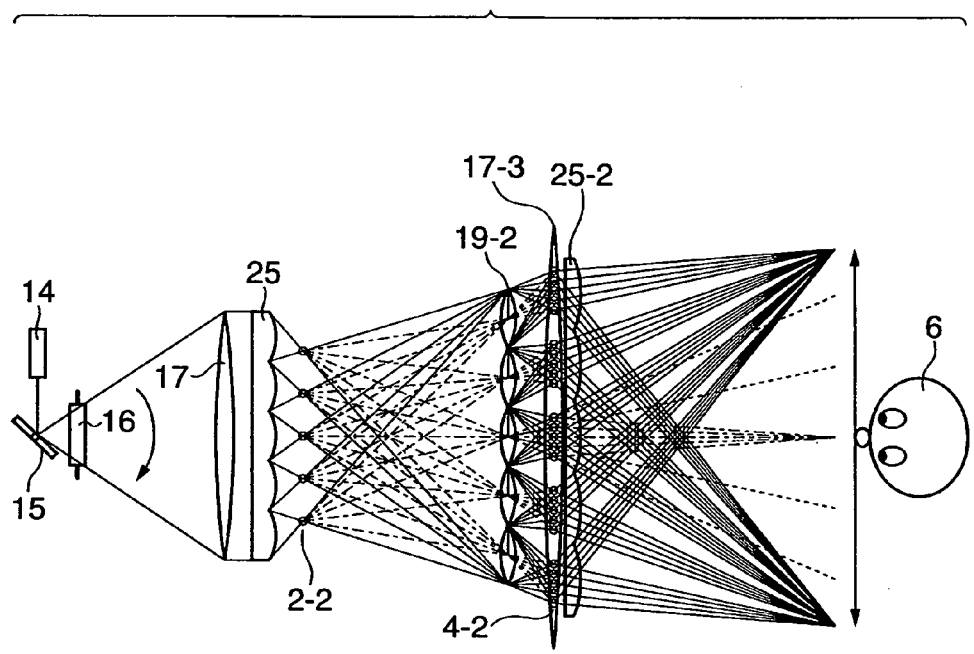
FIG. 19 is a schematic view of a 3D image display apparatus having a spatial light emitting point multiplexer, in which vertical parallax is considered, according to the fifth embodiment of the present invention.
Figure 20:
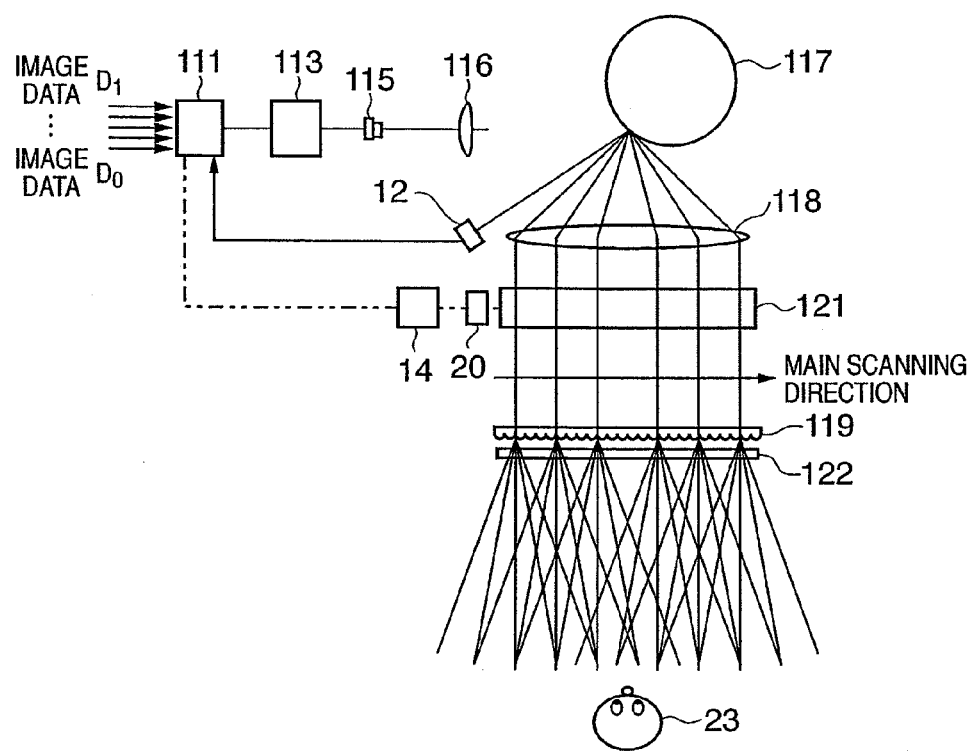
FIG. 20 is a schematic view of a conventional 3D image display apparatus.

In the embodiment of FIG. 17B, a unidirectional light diffusion plate 18 which diffuses light only in the vertical direction is inserted at the position of or immediately after the high-density light emitting point array 4. With this structure, a device arrangement is described in which the parallax information in the vertical direction is discarded to enlarge the observation range in the vertical direction, so the number of apparent pixels of the 3D image when observing a 3D image is increased. This embodiment can also be applied to a 3D image display apparatus which is to express vertical parallax information as well. FIG. 19 is a schematic view of the fifth embodiment in which the 3D image display apparatus is combined with a lens array 19-2 serving as a spatial light emitting point multiplexer.

FIG. 19 shows an optical system which corresponds to the optical system of FIG. 7 with consideration to vertical parallax information.

Referring to FIG. 19, reference numeral 25 denotes an IP lens. When a parallel beam shaped by a collimator lens 17 enters the IP lens 25, a light emitting point array 2-2 which spreads rays in the vertical direction as well is formed, so a 3D image can be displayed.

The rays emitted from the light emitting point array 2-2 enter the two-dimensional lens array 19-2, which serves as a spatial light emitting point multiplexer and has a lens periodical structure in the vertical direction as well, to form a high-density light emitting point array 4-2 in which the light emitting point array 2-2 is multiplexed.

A field lens 17-3, which can focus rays from the multiplexed high-density light emitting point array 4-2 having ray directions in the vertical direction as well, and an IP lens 25-2 which is employed for periodical focusing effect, are employed to control the ray emitting directions.

Thus, high-resolution 3D image display which has parallax information in the vertical direction as well can be realized.

To introduce the light emitting point multiplexer to the 3D image display apparatus with consideration to the vertical parallax information is possible not only when the light emitting point multiplexer is the spatial light emitting point multiplexer 19-2 but also when it is a time light emitting point multiplexer or a multiplexer having the functions of the two multiplexers, even if the multiplexer has an arrangement other than that described above.

As has been described above, according to the above embodiments, when 3D image display with the "super multi-view region" is to be performed, to present many parallax images in many directions with small angular pitches is compatible with to display the individual parallax images with high resolution. A 3D image display device can be obtained in which the relationship among the resolution of the 3D image, the number of viewpoints, and the viewpoint pitches is also set with high degrees of freedom.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-214515, filed Jul. 25, 2005, which is hereby incorporated by reference herein in its entirety.

What is claimed is:

1. A 3D image display apparatus comprising:
a ray modulator which emits a directive ray in a time series manner based on parallax image information;
a scanner which deflects the ray from said ray modulator, said scanner serving to two-dimensionally scan a predetermined plane with the ray based on the parallax image information in synchronism with modulation of the ray emitted from said ray modulator;
a light emitting point distributor which is arranged on a light emission side of said scanner to form a plurality of individual primary light emitting points, rays emitted from the primary light emitting points in a time series manner being emitted in different directions such that optical paths of at least two rays emitted from different ones of the primary light emitting points intersect each other; and a light emitting point multiplexer arranged on the light emission side of said light emitting point distributor, said light emitting point multiplexer forming, from each individual primary light emitting point, a plurality of secondary light emitting points as images of the individual primary light emitting points, wherein the number of the plurality of secondary light emitting points is greater than the number of the plurality of primary light emitting points, wherein a density of the plurality of secondary light emitting points is higher than a density of the plurality of primary light emitting points, and an array direction of the plurality of secondary light emitting points formed by said light emitting point multiplexer and an array direction of the plurality of primary light emitting points is the same direction.

2. The apparatus according to claim 1, wherein said light emitting point multiplexer forms the plurality of secondary light emitting points by displacement of a lens or a mirror.

3. The apparatus according to claim 1, wherein said light emitting point multiplexer has an optical element array in which a plurality of optical elements are arrayed in one direction, and the plurality of secondary light emitting points are formed by displacement of said optical element array.

4. The apparatus according to claim 3, wherein the optical element array includes a lens array, a double refraction element, an opening array or a diffraction grating array.

5. The apparatus according to claim 1, wherein said light emitting point multiplexer includes a parallax barrier in which a plurality of slits are arrayed in one direction, and an array direction of the plurality of slits is the same as the array direction of the plurality of primary light emitting points.

6. The apparatus according to claim 1 wherein said light emitting point multiplexer includes a lenticular lens in which a plurality of cylindrical lenses are arrayed in one direction, and an array direction of the plurality of cylindrical lenses is the same as the array direction of the plurality of primary light emitting points.

7. The apparatus according to claim 1, wherein said light emitting point multiplexer includes an optical member array in which a plurality of optical members are arrayed, and when rays emitted from the plurality of primary light emitting points enter one optical member of the plurality of optical members, the one optical member forms plural secondary light emitting points.

8. The apparatus according to claim 1, wherein said light emitting point multiplexer includes an optical member array in which a plurality of optical members are arrayed, and when all rays emitted from the plurality of primary light emitting points enter one optical member of the plurality of optical members, the one optical member forms plural secondary light emitting points of a number corresponding to the number of the plurality of primary light emitting points.

9. The apparatus according to claim 1, wherein said light emitting point multiplexer includes a lens array in which a plurality of element lenses are arrayed, and has a field optical system which is arranged at a position where the plurality of primary light emitting points is formed by said light emitting point distributor, and a ray emitted from one primary light emitting point of the plurality of primary light emitting points enters all of the plurality of element lenses of the lens array.

10. The apparatus according to claim 1, wherein the secondary light emitting points are focusing points of rays emitted from the light emitting point multiplexer.

11. The apparatus according to claim 1, wherein the primary light emitting points are formed between the light emitting point distributor and the light emitting point multiplexer.

12. A 3D image display apparatus comprising:

a ray modulator which emits a directive ray in a time series manner based on parallax image information;

a scanner which deflects the ray from said ray modulator, said scanner serving to two-dimensionally scan a predetermined plane with the ray based on the parallax image information in synchronism with modulation of the ray emitted from said ray modulator;

a light emitting point distributor which is arranged on a light emission side of said scanner to form a plurality of individual primary light emitting points, rays emitted from the primary light emitting points in a time series manner being emitted in different directions such that optical paths of at least two rays emitted from different ones of the primary light emitting points intersect each other; and a light emitting point multiplexer arranged on the light emission side of said light emitting point distributor, said light emitting point multiplexer forming, from each individual primary light emitting point, a plurality of secondary light emitting points as images of the individual primary light emitting points, wherein the number of the plurality of secondary light emitting points is greater than the number of the plurality of primary light emitting points, and an array direction of the plurality of secondary light emitting points formed by said light emitting point multiplexer and an array direction of the plurality of primary light emitting points is the same direction.

13. The apparatus according to claim 12, wherein said light emitting point multiplexer has an optical element array in which a plurality of optical elements are arrayed in one direction, and the plurality of secondary light emitting points are formed by displacement of said optical element array.

14. The apparatus according to claim 13, wherein the optical element array includes a lens array, a double refraction element, an opening array or a diffraction grating array.

15. The apparatus according to claim 12, wherein said light emitting point multiplexer includes a parallax barrier in which a plurality of slits are arrayed in one direction, and an array direction of the plurality of slits is the same as the array direction of the plurality of primary light emitting points.

16. The apparatus according to claim 12 wherein said light emitting point multiplexer includes a lenticular lens in which a plurality of cylindrical lenses are arrayed in one direction, and an array direction of the plurality of cylindrical lenses is the same as the array direction of the plurality of primary light emitting points.

17. The apparatus according to claim 12, wherein said light emitting point multiplexer includes an optical member array in which a plurality of optical members are arrayed, and when rays emitted from the plurality of primary light emitting points enter one optical member of the plurality of optical members, the one optical member forms plural secondary light emitting points.

18. The apparatus according to claim 12, wherein said light emitting point multiplexer includes an optical member array in which a plurality of optical members are arrayed, and when all rays emitted from the plurality of primary light emitting points enter one optical member of the plurality of optical members, the one optical member forms plural secondary light emitting points of a number corresponding to the number of the plurality of primary light emitting points.

19. The apparatus according to claim 12, wherein said light emitting point multiplexer includes a lens array in which a plurality of element lenses are arrayed, and has a field optical system which is arranged at a position where the plurality of primary light emitting points is formed by said light emitting point distributor, and a ray emitted from one primary light emitting point of the plurality of primary light emitting points enters all of the plurality of element lenses of the lens array.

20. The apparatus according to claim 12, wherein the primary light emitting points are formed between the light emitting point distributor and the light emitting point multiplexer.

* * * * *